Figure 1:
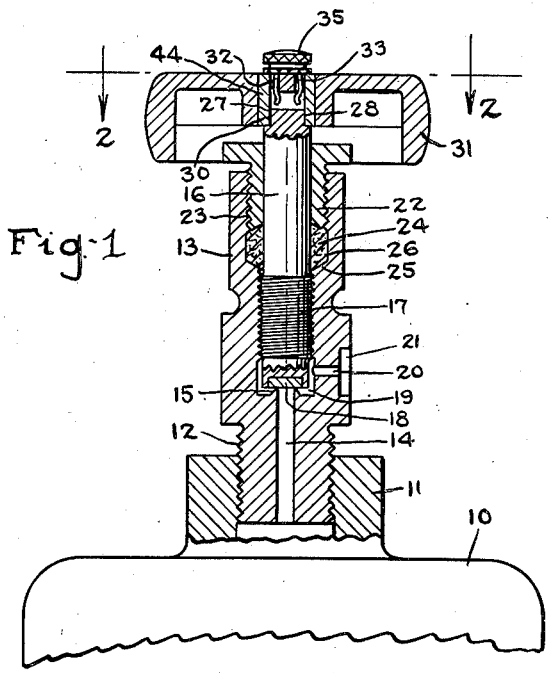

May 14, 1940.  J. G. SHOLES  2,200,999
VALVE HANDLE OF COMPRESSED GAS TANKS

Filed July 5, 1938  2 Sheets-Sheet 1

Inventor:
Justin G. Sholes
By Whiteley and Ruckman
Attorneys.

May 14, 1940.  J. G. SHOLES  2,200,999
VALVE HANDLE OF COMPRESSED GAS TANKS
Filed July 5, 1938  2 Sheets-Sheet 2
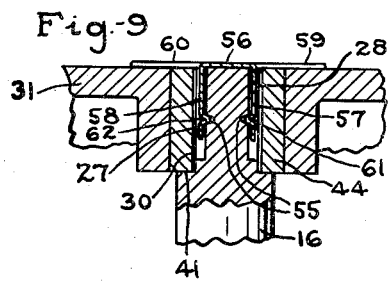
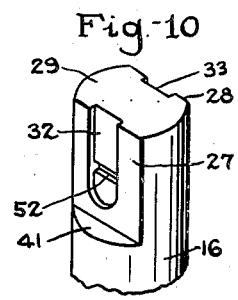
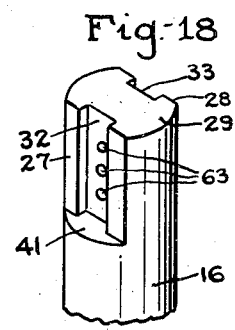
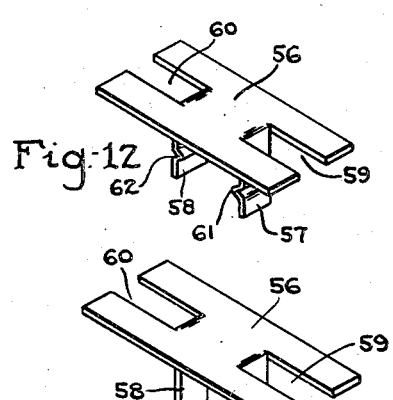
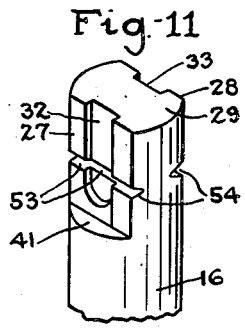
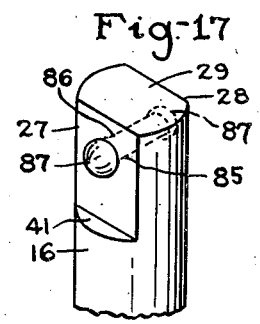
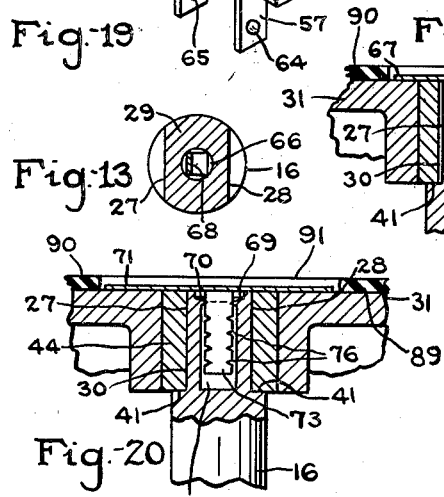
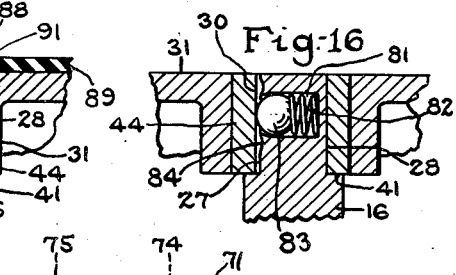
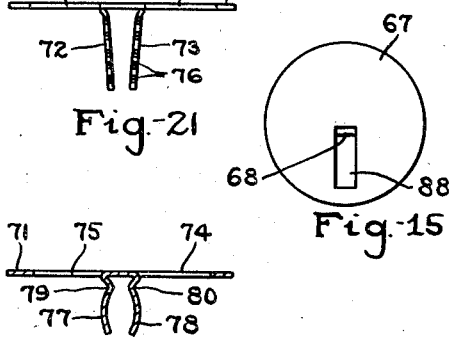
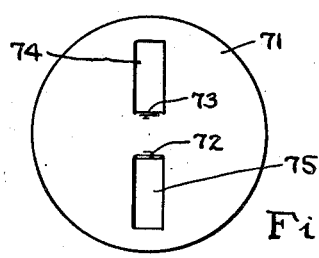
Inventor:
Justin G. Sholes.
By Whiteley and Ruckman
Attorneys.

Patented May 14, 1940

2,200,999

UNITED STATES PATENT OFFICE 2,200,999

VALVE HANDLE OF COMPRESSED GAS TANKS

Justin G. Sholes, Cleveland, Ohio, assignor to The Ohio Chemical and Manufacturing Company, Cleveland, Ohio, a corporation Application July 5, 1938, Serial No. 217,386

4 Claims. (Cl. 287—53)

My invention relates to valve handles of compressed gas tanks and has for its object to provide on a handle of common form adapted to be grasped in the hand of an operator for turning on and off gas or other fluid held under pressure within a cylinder or other container, readily removable means for holding the valve handle from being displaced from the valve stem, while leaving it free to be readily removed therefrom to be attached to other valve stems.

In various arts, and particularly in the art of administering gases for producing anesthesia or analgesia, it is customary for the gases employed to be stored under high pressure in containers, which commonly are cylinders of various sizes. These cylinders are commonly provided with valve heads, including a rotary valve and passageways for opening or shutting off flow of gas from the container. The valve stems are ordinarily provided with flattened upper ends for receiving a correspondingly-shaped socket in a hand wheel whereby by the use of the hand the valve can be turned to open or close flow of gas from the container. Such a container, as employed in connection with various forms of anesthetizing machines, must have the valve stem slip through a yoke in order that it may be locked in position to deliver gas to the gas-administering machine. For this reason in connection with such uses it is necessary to have the hand wheel for operating the valve readily removable. Also, the containers when empty are exchangeable in connection with the purchase of gas in filled containers, and it is undesirable, whatever use may be made of the gas containers, to have the hand wheel for operating the valve attached when such exchange is made, both because in shipping of containers the valve handle will be liable to be damaged or destroyed, and more particularly because if the valve handle were present on the valve stem during handling and shipping there would be danger that it might be operated and the valve opened to permit waste of the compressed gas within the container.

It is, therefore, common practice to provide hand wheels for valve control which have their sockets merely seated upon the faced end of the valve stem, and which, thus, are readily movable from one valve stem to another. A serious disadvantage in connection with the use of such readily-removable valve wheels resides in the fact that they are liable to be knocked off, falling on the floor and causing noise and inconvenience to the operator, or perhaps being entirely missing when it is desired to operate the valve to permit flow of gas. Also in falling upon concrete floors or the like the valve wheels often are distorted or broken, breakage being particularly common where, as is usual, the hand wheels are made of Bakelite.

It is a particular object of my invention to provide means in connection with a valve wheel of the type described which, while leaving said valve wheel readily removable from the squared end of the valve stem whenever it is desired to remove it, still is held against accidental or unintentional removal.

The full objects and advantages of my invention will appear in connection with the detailed description thereof which is hereinafter given, and its novel features are particularly pointed out in the claims.

In the drawings, illustrating an application of my invention in some of its forms—

Figure 3:
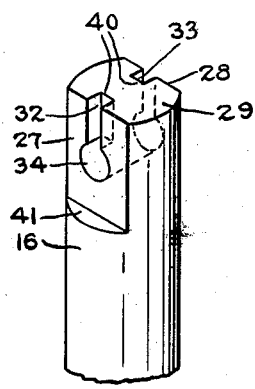
Figure 2:
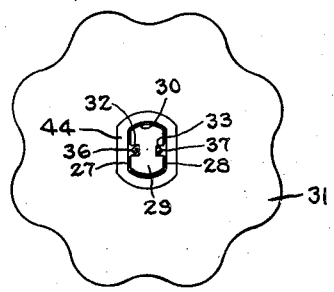
Figure 4:
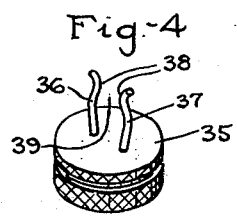
Figure 7:
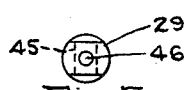
Figure 5:
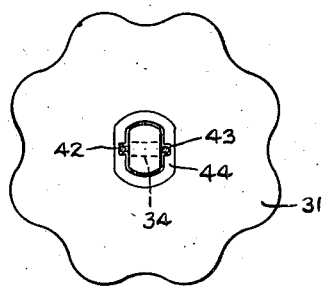
Figure 6:
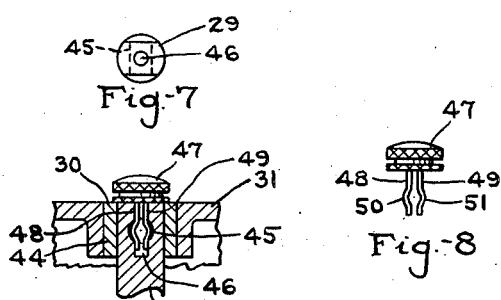
Figure 8:
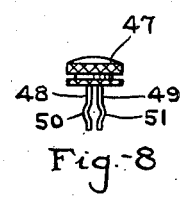

Fig. 1 is a view of a portion of a gas tank container showing the valve head in section with the valve stem in position and held against accidental removal by the invention herein defined. Fig. 2 is a plan view, sectional in one detail, taken on line 2—2 of Fig. 1. Fig. 3 is a perspective view of a valve stem embodying my improvements shown in enlarged detail. Fig. 4 is a perspective view of the valve stem cap forming part of my invention. Fig. 5 is a top plan view of the hand wheel, similar to Fig. 2, showing the grooves in the ferrule of the hand wheel instead of in the flattened sides of the stem. Fig. 6 is a sectional elevation of an end of a valve stem having a modified arrangement for locking the hand wheel on the valve stem. Fig. 7 is a top plan view of the end of the stem only as shown in Fig. 6. Fig. 8 is a detail view of the locking button. Fig. 9 is a sectional elevation view taken across the end of the valve stem through its flattened sides showing a modification. Figs. 10 and 11 are perspective views of the end of a valve stem showing two forms of the modification seen in section in Fig. 9. Fig. 12 is a perspective view of the spring cap member applicable to the structures shown in Figs. 9 to 11. Fig. 13 is a sectional end view of the valve stem and Fig. 14 a sectional side view of the valve stem showing a modification in which a cap member is formed of a stamping with a single prong adapted to a central hole. Fig. 15 is a plan view of the circular retaining cap shown in position in Figs. 13 and 14. Fig. 16 is a transverse sectional view of a modification wherein a spring-held pawl is made to engage a side of the hand wheel socket to hold the hand wheel positioned. Fig. 17 is a perspective view of the end of the valve stem showing a bore extending across the valve stem and a plug of rubber protruding at the ends for engaging the side walls of the socket. Fig. 18 is a perspective view of a valve stem having grooves along the upper flattened sides and notches to receive spring arm members of a closure cap. Fig. 19 shows a cap member made of a stamping in a manner similar to that of Fig. 12, having raised portions in the spring arms to engage the depressions in the bottoms of the grooves shown in Fig. 17. Fig. 20 is a transverse view taken through the valve stem and part of the hand wheel showing a modification with a modified form of cap. Fig. 21 is a side view and Fig. 22 a top plan view of the form of cap illustrated in section in Fig. 20. Fig. 23 is a second modified form of cap made as a stamping and having a top plan view the same as in Fig. 22.

As shown, a compressed gas container 10 in the well-known form of a gas cylinder is provided with an extension 11 into which is threaded in gastight relation an extension boss 12 of a valve head 13. The boss 12 is provided with a central bore 14 surrounded at its upper end by a valve seat 15. A valve stem 16 is threaded at 17 into the valve head 13 and has a valve block 18 extending into valve chamber 19 about valve seat 15. A bore 20 leads from valve chamber 19 to a chamber or recess 21 in the face of valve head 13 which is adapted to receive any suitable connection for conveying the gas to apparatus to be supplied therewith, such as gas-administering machines for effecting anesthesia or analgesia.

Surrounding valve stem 16 is a packing nut 22 threaded at 23 into an internal passageway through valve head 13, and packing nut 22 engages packing 24 surrounding valve stem 16, which is forced against an annular shoulder 25 and between outer wall of valve stem 16 and inner wall of the bore 26 in valve head 13. The valve stem 13 in common practice is formed with flat faces 27, 28, which faces are parallel, giving a square-faced upper end 29 to the valve stem with shoulders 41 to limit the extent of said valve faces, as clearly shown in Fig. 3. This is the common and well-known form of the upper end of the valve stem and is adapted to receive the socket 30 of a valve wheel 31 of well-known construction, which is shown in cross-sectional detail in Fig. 1.

According to my invention I form along the longitudinal centers of faces 27 and 28 a pair of oppositely-disposed longitudinal or vertical grooves 32 and 33, as best shown in Fig. 3. I also form a transverse bore 34 into which the grooves 32 and 33 extend, the bore 34 extending to the opposite faces 27 and 28 of the flat portions of the upper end of the valve stem. A retainer head or button 35 is provided of any desired form or material, which carries a pair of spring fingers 36 and 37. The spring fingers lie in a diametrical plane through the center of button 35, and are bowed inwardly as indicated at 38 in Fig. 4, so that the space 39 betwen them is narrower than the distance 40 between adjacent faces of the grooves 32 and 33. When, therefore, the outwardly-bowed ends of spring fingers 36 and 37 are pressed upon the edges of grooves 32 and 33, they will be expanded until the guard button 35 is pressed down into the position shown in Fig. 1, when the spring fingers, spread apart by this action, will snap into the transverse aperture 34 over its upper edges to hold the button in position upon the upper end 29 of the valve stem 13. The button 35, as clearly shown, overlaps the margins of the opening or socket portion of the valve wheel 31, so by this means the valve wheel is held in position upon the upper end of valve stem 13, and is held with a sufficient degree of security to prevent the valve wheel being accidentally or unintentionally displaced from or knocked off of the said valve stem. At the same time the button 35 can be readily removed merely by pulling it outwardly, when the spring members 36 and 37 will yield at the bowed portions 38, spreading sufficiently to permit withdrawal of the button, which automatically releases the hand wheel for removal as may be desired. In practice, however, it may be found most convenient simply to grip the hand wheel and pull the button and the spring fingers free along with the hand wheel.

In the modification shown in Fig. 5, instead of the grooves 32 and 33 being formed in and along the flattened sides of the upper end of the valve stem, grooves 42 and 43 are formed in the metallic ferrule 44 on the hand wheel 31. The spring fingers 36 and 37 will be suitably positioned to pass down through grooves 42 and 43 and spring into the depressions formed at the ends of transverse bore 34, indicated in dotted lines in Fig. 5.

In the form of the invention shown in Figs. 6 to 8, a transverse bore 45 is formed somewhat larger in diameter than the bore 34 shown in Fig. 3, and a bore 46 is formed in the end 29 at the center of its upper face, passing across the transverse bore 45. Button 47 is provided with adjacent spring fingers 48 and 49, which are bowed outwardly as indicated at 50 and 51. These fingers are thrust into the vertical bore 36, and the outwardly bowed portions 50 and 51 snap into the expanded spaces formed by the transverse bore 45, as clearly shown in Fig. 6, thus operating to hold the hand wheel 31 positioned on the top of valve stem 13 yet readily removable therefrom.

As shown in Figs. 9, 10 and 11, the grooves 32 and 33 in side faces 27 and 28 have formed across them depressions 52 which cut across the faces of the grooves only, as shown in Fig. 10, or depressions 53 shown in Fig. 11 which cut clear across the faces 27 and 28 of the valve stem and also the faces of grooves 32 and 33. It will be apparent that in operative effect the constructions of Figs. 10 and 11 are the same, the transverse grooving across the faces as in Fig. 11 being a little more economical in manufacture. The grooves, either 52 or 53 are V-shaped in cross section, as clearly indicated at 54 in Fig. 11 and at 55 in Fig. 9. To cooperate with the grooves 52 or 53 a holding head 56 is formed as a stamping from sheet metal. Ears 57 and 58 are cut out from the body of the sheet metal as indicated at 59, 60 of Fig. 12, and are bent at substantially right angles to the face of the retaining head 56. These ears are formed with V-shaped inwardly-extending raised portions 61 and 62, which, as clearly shown in Fig. 9, spring into the V-shaped grooves 54 formed on the valve stem and hold the valve wheel 31 secured on the valve stem against accidental removal, yet so secured that the valve wheel readily can be removed.

A very similar arrangement is shown in Figs. 18 and 19 wherein a series of depressions 63 are formed in the faces of slots 32 and 33. These depressions may conveniently be milled of a conical shape and are adapted to receive projections 64 and 65 on the ears 57 and 58. By forming a series of the depressions 63 the cap 56 is adapted to adjust itself to hand wheels of varying thickness.

In the form of the invention shown in Figs. 13 and 14 a central vertical aperture 66 is formed extending through the top 29 of valve stem 16 between faces 27 and 28 thereon. A disc 67 of fairly substantial material has stamped from aperture 88 a tongue 68 of the general shape shown in Fig. 14 and positioned so as to be inserted within aperture 66 in such manner as to cause the tongue to bind the walls of aperture 66 and thereby hold the cap 67 in position so as to hold the valve wheel 31 upon the end of the valve stem. A modification of this arrangement is shown in Fig. 20 wherein the bore 66 unites with a wider bore 69 which is upset by a tool to form an annular ridge 70. A circular head member 71 has a pair of ears 72 and 73 stamped therefrom, leaving the openings 74 and 75, as clearly shown in Figs. 21 and 22. The edges of ears 72 and 73 will have notches 76 formed therein, as best shown in Fig. 20. When the ears 72 and 73 are forced into the bore 66 they can be sprung inwardly to pass the annular ridge 70 and will spring into the ridge to hold the retainer plate 71 in position on the top of valve stem 16, and in that way to hold the valve wheel 31 removably positioned on the valve stem. Fig. 23 shows a variant of the circular holding members of Figs. 21 and 22 wherein ears 77 and 78 are bowed outwardly with depressed portions 79 and 80 adapted to receive the annular ledge 70 and hold the member 71 upon the end of valve stem 16 and thereby hold the valve wheel 31 removably positioned on the valve stem.

In the above forms of the invention, as shown in Figs. 14 and 20, there will preferably be employed a rubber hand grip encasing the body of the valve wheel of Bakelite or other desired material. The hand grip indicated at 89 in Figs. 14 and 20 has a plane surface 90 overlying the top of the hand wheel 31, with a central opening 91 which may be circular in cross section to receive the body of the holding member such as 67 or 71. This leaves the surface of said holding member below the top surface 90 of the rubber hand grip 89, so that when the hand is pressed upon the hand grip in operating the valve wheel the portions of the holding member 71 or 67 above the valve stem will be guarded from the palm of the hand and not inflict injury or discomfort to the hand.

In another modification, as shown in Fig. 16, a bore 81 extends transversely through one face 28 of the upper portion of the valve stem but not clear across through the other face. Within the bore 81 are positioned a spring 82 and a ball 83, the latter being held within bore 81 to compress spring 82 by means of upsetting the metal around the outer portion of the bore, as indicated at 84. If desired, depressions may be made in the inside of the ferrule 44 for receiving the protruding portion of ball 83, or the force exerted by spring 82 against the inner wall of the ferrule may be sufficient to hold the hand wheel 31 removably positioned on the valve stem.

In Fig. 17 is shown a modification of the arrangement of Fig. 16 in which there is a bore 85 extending entirely through from face 27 to face 28 on the upper end of the valve stem, and in the bore 25 is seated a rubber plug 86 having ball-shaped ends 87 extending out at either side and adapted to engage the inner faces of the ferrule 44 on the valve wheel 31.

In each of the above-described forms of my invention there is formed a channel or channels in the upper squared end of the valve stem upon which the hand wheel is adapted to be seated, and cooperating with such channel or channels is a member engageable with the valve stem and the inner walls of the ferrule thereon whereby the valve wheel is removably held upon the valve stem, yet with a sufficient degree of security so that the valve wheel cannot be accidentally displaced or come off apart from the will and intent of the operator. In the foregoing description the objects and advantages of my invention have been quite fully pointed out. The fundamental advantage resides in the fact that by means of a simple and relatively inexpensive modification of the upper end of the valve stem and the application thereto of a member jointly cooperating with said modified portion of the valve stem and with the valve wheel, this valve wheel, while still being removable, as is requisite, yet is continuously held upon the valve stem to which it has been applied with a sufficient degree of firmness so that it will not come off excepting when the operator desires to take it off, and then it can be simply and readily removed and re-set on the corresponding valve stem on another compressed gas container.

I claim:

1. In a gas container, a valve stem provided with parallel plane faces at its upper end and a longitudinal channel, there being a part cut out into said stem from said channel at one point in its extent to form a recess at said point, a valve handle having a socket adapted to embrace said plane faces and conforming thereto, and a headed fastening member adapted to contact said valve handle having thereon a resilient finger adapted to extend along said channel, with a deformed part thereon adapted to seat in said recess for holding said valve handle positioned on said valve stem and freely removable therefrom.

2. A gas container provided with a valve stem having parallel plane faces at its upper end and a longitudinal channel, a transverse bore formed through the stem and said channel, a valve handle having a socket adapted to embrace said plane faces and conforming thereto, and a headed fastening member adapted to contact said valve handle having thereon a resilient finger adapted to extend along said channel, with a deformed part thereon adapted to seat in an end of said bore for holding said valve handle positioned on said valve stem and freely removable therefrom.

3. A gas container provided with a valve stem having parallel plane faces at its upper end and a longitudinal channel extending along each of said faces, a transverse bore formed through the stem and said channel to provide opposite recesses connected with the channels, a valve handle having a socket adapted to embrace said plane faces and conforming thereto, and a headed fastening member adapted to contact said valve handle having thereon a pair of resilient fingers adapted to extend along said respective channels, and a deformed part on each of said fingers adapted to seat respectively in opposite ends of said bore for holding said valve handle positioned on said valve stem and freely removable therefrom.

4. In a gas container, a valve stem provided with parallel plane faces at its upper end and a longitudinal channel consisting of a bore down the center of said valve stem, a transverse bore formed through the stem and across said channel, a valve handle having a socket adapted to embrace said plane faces and conforming thereto, and a headed fastening member adapted to contact said valve handle having thereon a resilient finger adapted to extend along said central bore, with a deformed part thereon adapted to seat in said bore where the same unites with the channel for holding said valve handle positioned on said valve stem and freely removable therefrom.

JUSTIN G. SHOLES.